United States Patent
Schat

(10) Patent No.: US 11,171,793 B2
(45) Date of Patent: Nov. 9, 2021

(54) METHOD AND SYSTEM FOR DETECTING AN ATTACK ON A PHYSICALLY UNCLONABLE FUNCTION (PUF)

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 141 days.

(21) Appl. No.: 16/589,232

(22) Filed: Oct. 1, 2019

(65) Prior Publication Data

US 2021/0099314 A1  Apr. 1, 2021

(51) Int. Cl.
*H04L 9/32* (2006.01)
*H04L 9/08* (2006.01)
*H04L 9/06* (2006.01)

(52) U.S. Cl.
CPC .......... *H04L 9/3278* (2013.01); *H04L 9/0643* (2013.01); *H04L 9/0866* (2013.01); *H04L 2209/12* (2013.01); *H04L 2209/30* (2013.01)

(58) Field of Classification Search
None
See application file for complete search history.

(56) References Cited

U.S. PATENT DOCUMENTS

| | | | |
|---|---|---|---|
| 8,981,810 B1 * | 3/2015 | Trimberger | H03K 19/003 326/8 |
| 9,444,618 B1 | 9/2016 | Trimberger et al. | |
| 9,948,470 B2 * | 4/2018 | Guo | H04L 63/0853 |
| 10,027,472 B2 | 7/2018 | Suresh et al. | |
| 10,256,983 B1 * | 4/2019 | Bauer | H04L 9/3278 |
| 2013/0019324 A1 * | 1/2013 | Tehranipoor | G09C 1/00 726/34 |
| 2014/0108786 A1 * | 4/2014 | Kreft | G06F 21/335 713/156 |
| 2015/0092939 A1 * | 4/2015 | Gotze | H04L 9/0866 380/2 |
| 2018/0183613 A1 * | 6/2018 | Dafali | H04L 9/3278 |
| 2019/0026457 A1 * | 1/2019 | Plusquellic | G06F 21/30 |
| 2019/0156066 A1 * | 5/2019 | Foster | G06F 21/72 |

(Continued)

OTHER PUBLICATIONS

Santikellur, Pranesh et al., "Deep Learning based Model Building Attacks on Arbiter PUF Compositions", 2019, IEEE, pp. 1-10. (Year: 2019).*

(Continued)

*Primary Examiner* — Michael Pyzocha
(74) *Attorney, Agent, or Firm* — Daniel D. Hill

(57) ABSTRACT

A method and data processing system is provided for detecting an attack on a physically unclonable function (PUF). In the method, a first list of PUF responses to challenges is produced during production testing of an integrated circuit comprising the PUF. The first list is stored in a memory on the integrated circuit. A second list of PUF responses to the challenges is produced during normal operation of the integrated circuit in the field. The second list is compared to the first list. A difference between entries of the first and second lists computed. If the difference is greater than a threshold difference, then an indication of a hardware trojan is generated. The method may also include monitoring a series of challenges for an indication of a non-random pattern in the series. Detection of a non-random pattern may indicate a modeling attack.

20 Claims, 7 Drawing Sheets

(56) References Cited

U.S. PATENT DOCUMENTS

| | | | | |
|---|---|---|---|---|
| 2020/0044872 | A1* | 2/2020 | Willsch | H04L 9/3278 |
| 2020/0050430 | A1* | 2/2020 | Naslund | G06F 7/588 |
| 2020/0076624 | A1* | 3/2020 | Cambou | H04L 9/3239 |
| 2020/0162271 | A1* | 5/2020 | Cambou | G09C 1/00 |
| 2020/0169423 | A1* | 5/2020 | Cambou | H04L 9/3278 |
| 2020/0295954 | A1* | 9/2020 | Cambou | H04L 9/3247 |
| 2020/0396092 | A1* | 12/2020 | Cambou | H04L 9/3278 |
| 2021/0036873 | A1* | 2/2021 | Kim | H04L 9/0869 |

OTHER PUBLICATIONS

Ganta, Dinesh et al.; "Study of IC Aging on Ring Oscillator Physical Unclonable Functions;" Fifteenth International Symposium on Quality Electronic Design; Mar. 3-5, 2014; Santa Clara, CA; DOI: 10.1109/ISQED.2014.6783360.

Guo, Qingli et al.; "Efficient Attack on Non-Linear Current Mirror PUF With Genetic Algorithm;" 2016 IFFF 25th Asian Test Symposium (ATS) 2016; Nov. 21 -24, 2016; Hiroshima, Japan; DOI: 10.1109/ATS.2016.21.

Helfmeier, Clemens et al.; "Cloning Physically Unclonable Functions;" 2013 IEEE International Symposium on Hardware-Oriented Security and Trust (HOST); Jun. 2-3, 2013, Austin, Texas; DOI: 10.1109/HST.2013.6581556.

Holbomb, Daniel E. et al.; "Bitline PUF: Building Native Challenge-Response PUF Capability into Any SRAM;". Cryptographic Hardware and Embedded Systems—CHES 2014; Sep. 23-26, 2014; Lecture Notes in Computer Science, vol. 8731. Springer, Berlin, Heidelberg; DOI https://doi.org/10.1007.

Khalafalla, Mahmoud, et al.; "PUFs Deep Attacks: Enhanced Modeling Attacks Using Deep Learning Techniques to Break the Security of Double Arbiter PUFs;" 2019 Design, Automation & Test in Europe Conference & Exhibition; Mar. 25-29, 2019; Florence, Italy; DOI: 10.23919/DATE.2019.8714862.

Liu, Yuntao et al.; "A Combined Optimization-Theoretic and Side-Channel Approach for Attacking Strong Physical Unclonable Functions Physical Unclonable Functions;" IEEE Transactions on Very Large Scale Integration (VLSI) Systems; Jan. 2018, vol. 26, Issue: 1, p. 73-81; DOI: 10.1109/TVLSI.2017.2759731.

NXP Secure Microcontroller SmartMX3 P71D321 Data Sheet; Date of Release Oct. 2018; Document No. SMARTMX3FS Rev 0; https://www.nxp.com/docs/en/fact-sheet/P71D321.pdf.

Paral, Zdenek (Sid) et al.; "Reliable and Efficient PUF-Based Key Generation Using Pattern Matching;" 2011 IEEE International Symposium on Hardware-Oriented Security and Trust; Jun. 5-6, 2011, San Diego, CA; DOI: 10.1109/HST.2011.5955010.

Rührmair, Ulrich et al.; "PUFs in Security Protocols: Attack Models and Security Evaluations;" 2013 IEEE Symposium on Security and Privacy; May 19-22, 2013, Berkeley, California; DOI: 10.1109/SP. 2013.27.

Santikellur, Pranesh et al.; Deep Learning Based Model Building Attacks on Aribiter PUF Compositions; IACR Cryptology ePrint Archive 2019; 566 (2019).

Shimizu, Koichi et al.; "PUF as a Sensor;" IEEE 4th Global Conference on Consumer Electronics (GCCE); Oct. 27-30, 2015; Osaka, Japan; DOI: 10.1109/GCCE.2015.7398496.

Van Dijk, Marten et al.; "Physical Unclonable Functions in Cryptographic Protocols: Security Proofs and Impossibility Results;" Published in IACR Cryptology ePrint Archive 2012.

Wen, Yuejiang et al.; "PUF Modeling Attack Using Active Learning;" 2018 IEEE International Symposium on Circuits and Systems (ISCAS); May 27-30, 2018, Florence, Italy; DOI: 10.1109/ISCAS. 2018.8351302.

Yu, Meng-Day (Mandel) et al.; "A Lockdown Technique to Prevent Machine Learning on PUFs for Lightweight Authentication;" IEEE Transactions on Multi-Scale Computing Systems, vol. 2, No. 3, Jul.-Sep. 2016.

* cited by examiner

METHOD AND SYSTEM FOR DETECTING AN ATTACK ON A PHYSICALLY UNCLONABLE FUNCTION (PUF)

BACKGROUND

Field

This disclosure relates generally to physically unclonable functions (PUFs), and more particularly, to a method and system for detecting an attack on a PUF.

Related Art

A physically unclonable function (PUF) is a physical system that will produce a repeatable response when a stimulus is input. In a PUF, manufacturing variations of electronic devices may be used to provide a unique signature. The manufacturing variations are substantially fixed on a PUF, but random across different PUFs. There are various types of PUFs. One example of a PUF uses a static random-access memory (SRAM). SRAM cells are bi-stable, meaning that they only have two stable states. When powered up, the bi-stable SRAM cell will settle in one of the two stable states. Because a conventional SRAM is normally symmetrical, the state it will be in when powered-up is unpredictable. A portion, or segment, of an SRAM can be used as a PUF for generating an encryption key.

Physically unclonable functions are often used to make an integrated circuit (IC) unique. That is, a PUF can provide an IC with a unique code. Also, PUFs are used to protect valuable assets such as smartcards. By querying the PUF with a challenge, a response is produced. This challenge-response pairing behavior is device specific and easily evaluated but prohibitively difficult to predict. These features make PUFs very attractive for protecting assets. However, the high economic values being protected by PUFs makes them an attractive target for attacks.

The risk from malicious software is a common problem that requires continuous efforts to resist. However, malicious hardware circuits implemented on an electronic device, such as an IC, may also be a problem. The malicious circuits may be added to functional logic of an IC design without the semiconductor manufacturer's knowledge. The malicious circuits are commonly referred to as hardware trojans. The circuits may be added by, for example, intellectual property (IP) vendors, layout centers, or foundries. They can be used to, for example, disturb functionality, disclose secret keys, open backdoors for other attacks. For example, an attacker may be able to replace secret keys known only by a legitimate user with fake keys known only by the attacker. After the fake keys are created, the attacker can gain access to protected data or to get physical access to, e.g., the interior of automobiles.

Another type of attack against a PUF is known as a modeling attack. During a modeling attack, many challenges may be provided to a PUF and the PUF response observed. The goal of a modeling attack is to be able to predict the response for a given challenge, and to calculate for a desired response the challenge needed to create the response. When recreated, the challenge-response pair (CRP) would no longer be a one-way function.

Therefore, a need exists for a method to protect PUFs from at least the above-mentioned types of attacks.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
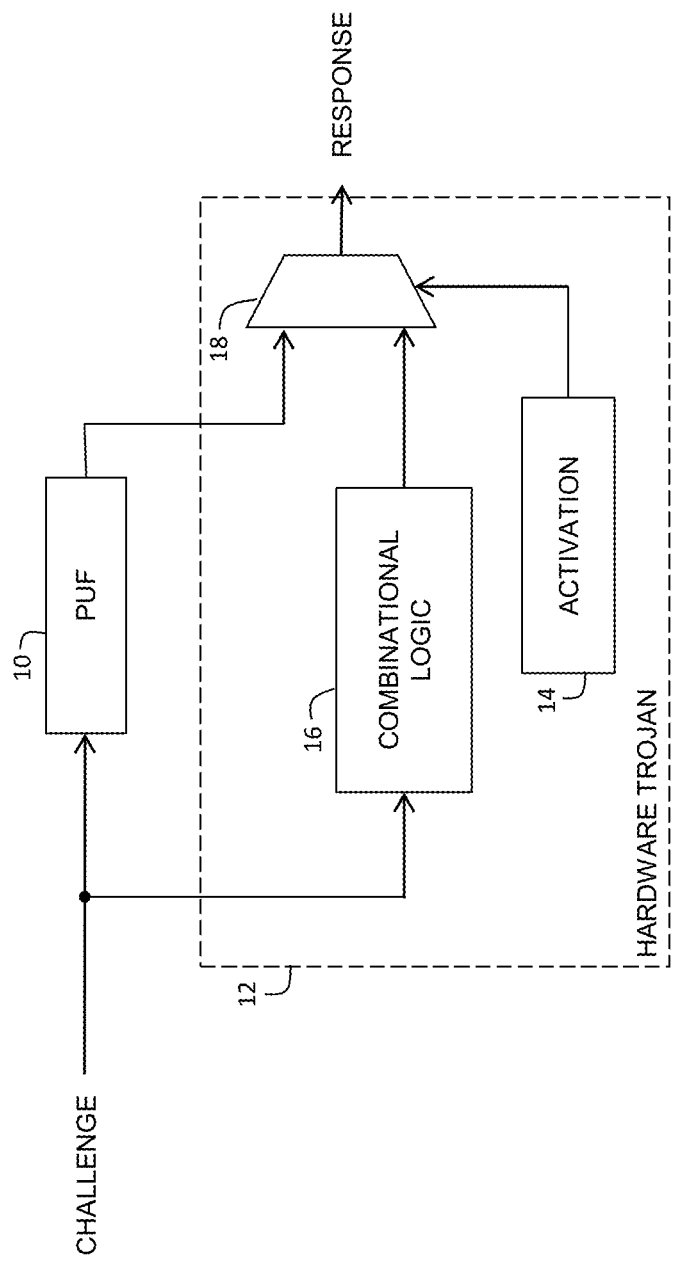
FIG. 1 illustrates a PUF with an example hardware trojan.

Generally, there is provided, a method and system for protecting a PUF from attacks. In one embodiment, protection is provided against hardware trojans that try to replace a PUF response with a trojan-defined PUF response. Also, protection is provided against modeling attacks. Each challenge-response pair provided to the PUF may be monitored for both the hardware trojan attack and the modeling attack. To protect against the trojan attack, a list, or digest, of PUF responses is generated from a subset of all possible challenges and stored on the IC to be protected. The digest may be first created during production testing. A second digest is created in the field, after manufacturing of the IC is complete and the IC has been implemented in an application. The second digest is updated from time-to-time while in the field. Then, the PUF response entries in the production digest are compared with PUF responses output from the PUF during operation in the field. There should be a small difference between the production digest entries and the received PUF response in the field. The small difference may be from, for example, device aging or changing environmental factors. If there is a big difference between the digest entries and a PUF response, then the PUF responses may be from a hardware trojan and an indication, or warning, is provided. Also, an indication of a trojan attack may be provided if there is no difference between the production digest entries and PUF responses from the field. To detect a modeling attack on the PUF, where the goal of the attack is to allow prediction of the response for a given challenge, the challenges input to the PUF are monitored. A series of challenges are monitored to detect a non-random pattern, e.g., time intervals between the challenges, a sequence of data words of the challenges, and the number of different challenges. Also, because the time intervals between packets may indicate an attacker is using an iterative machine learning process, packets of consecutive challenges are monitored, as well as, e.g., any pauses between the packets.

Detection mechanisms for both types of attacks can share on-chip resources. Also, the two methods of detection can be active on an alternating basis. For example, the modeling attack detection can be active while the hardware trojan attack detection is inactive, and vice versa.

In accordance with an embodiment, there is provided, a method for detecting an attack on a physically unclonable function (PUF), the method including: producing a first list of PUF responses to challenges received during production testing of an integrated circuit comprising the PUF; storing the first list in a memory on the integrated circuit; producing a second list of PUF responses to the challenges received during normal operation of the integrated circuit in the field; comparing the second list to the first list and determining a difference between entries of the first and second lists; and generating an indication when the difference is greater than a first threshold difference. Producing the second list may further include varying a supply voltage to the PUF to increase variation in the entries of the second list. Producing the first and second lists may further include applying one of a hash function, compression function, checksum to each of the first and second lists. The method may further include: creating first and second histograms from the first and second lists, respectively; and determining a difference between the first and second histograms, if the difference between the first and second histograms is greater than a second threshold difference, indicating a suspected attack on the PUF. The method may further include monitoring a series of challenges for PUF responses to detect a non-random timing pattern in the series of challenges, wherein detecting the non-random pattern may indicate a modeling attack on the PUF. Monitoring the series of challenges may further include one or more of monitoring time intervals between consecutive challenges for PUF responses, counting a frequency of different challenges, monitoring data words of the challenges for sequence patterns, and monitoring the challenges for PUF responses for a frequency of consecutive challenges for PUF responses. The PUF may be characterized as being a strong PUF. The PUF may be monitored for aging, and wherein if a lack of aging is detected, providing an indication.

In another embodiment, there is provided, a method for detecting an attack on a physically unclonable function (PUF), the method including: producing a first list of PUF responses to received challenges during manufacturing of an integrated circuit comprising the PUF; storing the first list in a memory; producing a second list of PUF responses to received challenges during normal operation of the integrated circuit in the field; comparing the second list to the first list and determining a difference between entries of the first and second lists; generating a first indication when the difference is greater than a threshold difference; monitoring a series of challenges for an indication of an ordered sequence of challenges; and generating a second indication in response to detecting a non-random timing pattern in the ordered sequence of challenges. Producing the second list may further include varying a supply voltage to the PUF to increase variation in the entries of the first and second lists. Producing the first and second lists may further include applying one of a hash function, compression function, checksum to each of the first and second lists. The method may further include: creating first and second histograms from the first and second lists, respectively; and determining a difference between the first and second histograms, if the difference between the first and second histograms is greater than a second threshold difference, indicating a suspected attack on the PUF. The non-random timing pattern may include one or more of counting a frequency of different challenges for PUF responses, monitoring data words of the challenges for sequence patterns, and monitoring the challenges for a time internal between consecutive challenges. The PUF may be characterized as being a strong PUF. The method may further include monitoring the PUF for aging, and wherein if a lack of aging is detected, providing an indication of a suspected trojan attack.

In yet another embodiment, there is provided, a physically unclonable function (PUF) protection system including: a digest calculation circuit, coupled to the output of a PUF, the digest calculation circuit for producing a first list of PUF responses during production testing of the PUF, and for producing a second list of PUF responses during normal operation of the PUF in the field; a memory for storing the first list; a comparison circuit for comparing the second list to the first list and determining a difference between entries of the first and second lists; and a control circuit for generating a first indication when the difference is greater than a threshold difference. The PUF protection system may be implemented on one or more integrated circuits. The PUF protection system of claim may further include a variable voltage regulator for providing a variable supply voltage to the PUF to increase variation of entries in the first and second lists. The PUF protection system may further include a challenge analysis circuit for monitoring a series of challenges for a pattern indicating a non-random timing characteristic of the series of challenges, the control circuit for generating a second indication in response to detecting the non-random characteristic. The PUF may be characterized as being a strong PUF.

FIG. 1 illustrates a PUF 10 with an example hardware trojan 12. Generally, PUF 10 can be any type of PUF, e.g., an SRAM PUF or an arbiter PUF. PUF 10 receives a challenge (CHALLENGE) and provides a response (RESPONSE). The example hardware trojan includes an activation mechanism 14. To avoid hardware trojan 12 from being detected by normal production testing, activation mechanism 14 may be provided to delay activation of hardware trojan 12 until receiving an indication that the device has been deployed in the field. The indication may be provided based on analog values that indicate a certain degree of aging. After hardware trojan 12 has been activated, combinatorial logic 16 receives a PUF challenge and outputs a response depending on the challenge. Multiplexer 18 receives the outputted response from combinatorial logic 16 and selects either the response from the PUF or the response from combinatorial logic 16 to be provided as the RESPONSE based on a control signal from activation circuit 14 (when activated).

The risk of implementations of hardware trojans may be defended against by using only trusted IP providers, trusted layout centers and certified layout and verification tools. As these measures cannot provide complete safety against hardware trojans, it is desirable to be able to detect hardware trojans on the IC using dedicated test methods. To prevent detection during production, the hardware trojans may delay activation to escape detection during production testing. Hardware trojan detection on ICs should thus include detection mechanisms for use in the field. While testing in the field for functional safety is widely used, testing in the field for hardware trojans detection is rarely used, and requires a different approach compared to a field test for functional safety.

Figure 2:
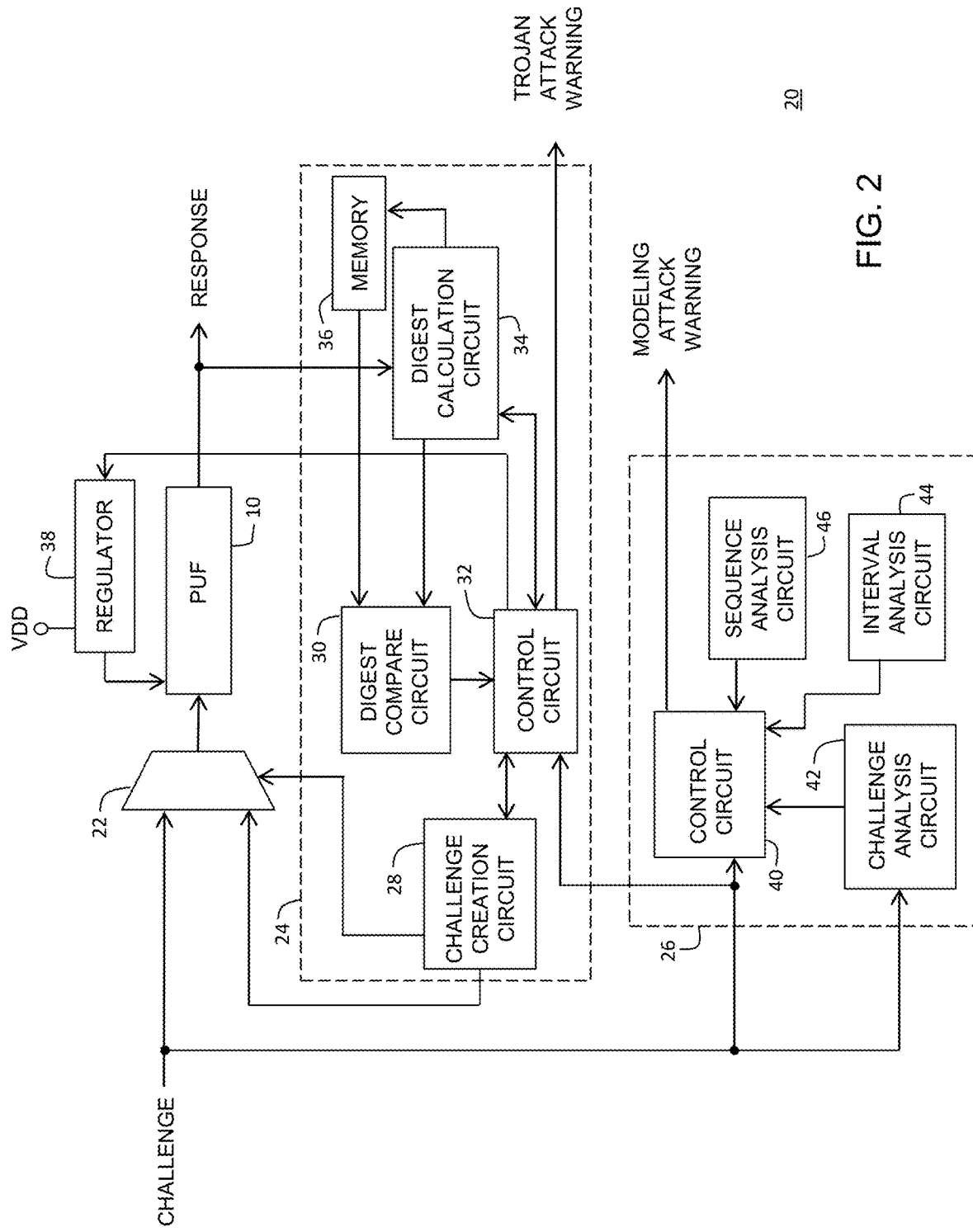
FIG. 2 illustrates a PUF protection system in accordance with an embodiment.

FIG. 2 illustrates a PUF protection system 20 for protecting PUF 10 in accordance with an embodiment. PUF protection system 20 includes multiplexer 22, hardware trojan detection circuit 24, and modeling attack detection circuit 26. Hardware trojan detection circuit 24 includes challenge creation circuit 28, digest compare circuit 30, control circuit 32, digest calculation circuit 34, and memory 36. Modeling attack detection circuit 26 includes control circuit 40, challenge analysis circuit 42, interval analysis circuit 44, and sequence analysis circuit 46. In another embodiment, control circuits 32 and 40 may be merged into one control circuit assigned to control both detection circuits 24 and 26.

During normal operation of PUF 10, a challenge labeled "CHALLENGE" is received at an input of multiplexer 22, and multiplexer 22 directs the challenge to PUF 10 in response to a control signal from challenge creation circuit 28. PUF 10 will then provide a response labeled "RESPONSE." To detect an activated hardware trojan with hardware trojan detection circuit 24, a list, or digest, of different PUF responses is first created. The list is created by inputting a subset of possible challenges and storing the resulting PUF responses. The first list is created during production testing when the IC having the PUF is relatively new and has not experienced significant aging. Because it is assumed the hardware trojans are not activated until after production test, the creation of the first digest is performed without being influenced by the hardware trojan. The first digest is stored in a memory, such as on-chip memory 36. Also, a hash function, compression function, or checksum may be applied to the first list when it is stored in memory 36. Alternately, one of the hash function, compression function, or checksum may be applied to the first list on a per entry basis. Memory 36 may be, e.g., a non-volatile memory (NVM) or a one-time programmable (OTP) memory. The stored first list is then used as a "golden" reference for comparison with digests that will be created later during operation in the field.

A second digest is created in the field and compared to the first "golden" digest to determine if a hardware trojan, if present on the IC, has been activated. The second digest may be created during test runs during periods when PUF 10 is idle, or not otherwise being used. To create the second digest, challenge creation circuit 28 creates a pre-defined number of challenges. A PUF typically has $2^8$ to $2^{128}$ different possible challenge-response pairs (CRPs). Hence using all possible CRPs for creating the digest is not possible, or practical, for mid-size or larger PUFs, so only a sub-set of the possible CRPs can be used. Preferably, these are not taken in regular address intervals of the challenge word space but are from irregular points of the challenge space. Challenge creation circuit 28 may be realized as a counter, a simple linear feedback shift register (LFSR), or it may be a software module of a simple central processing unit (CPU). To create an entry to the digest, a challenge from challenge creation circuit 28 is provided to an input of multiplexer 22. Challenge creation circuit 28 provides a control signal to direct multiplexer 22 to provide the created challenge to PUF 10. PUF 10 then provides a PUF RESPONSE. The RESPONSE is provided to an input of digest calculation circuit 34. Digest calculation circuit 34 may be implemented as a simple processor that performs integer operations to create an entry to the digest. One of the hash function, compression function, or checksum may be applied to the new entry if it had been applied to the entries of the production generated digest.

There are various ways to determine a digest entry. In one embodiment, a digest may be a histogram of PUF response sum-of-bits, which will be discussed below. Additional second digests will be created from time-to-time and compared to the production digest. The comparison is performed by digest compare circuit 30. Digest compare circuit 30 has one input connected to digest calculation circuit 34 to receive a response from the latest second field created list, and a second input connected to memory 36 to receive a response from the production test list. An output of digest compare circuit 30 is connected to control circuit 32. Control circuit 32 manages the process of creating and comparing entries of the production and field created digests. Control circuit 32 may be implemented as a state machine or as software running in a processor.

The field digests should be substantially the same as the production digest, except for small differences due to, e.g., aging and environmental changes. As an IC ages, the differences between the latest field digest and the production digest are expected to change. Also, the responses from the PUF are usually not reproducible without error, even without considering, e.g., aging. This is because all PUFs are based on small inaccuracies of the manufacturing process that causes identical elements to have small differences in certain parameters such as timing. Aging may affect the different elements and portions of elements in a different way. That is, the elements that were initially slower may become faster after some time. This may modify the PUF response. In the case of responses created by a trojan, however, the responses may not vary with time because constant responses are the basis of the PUF-based attacks enabled by the trojan. Therefore, if no variation in the responses is detected, it may indicate the responses were created by a trojan.

As mentioned above, PUFs use marginal variances between identical elements to produce a PUF response. These variances may be sensitive to changes in the power supply voltage provided to the PUF. A variable voltage regulator 38 may be used to cause more variations in the PUF responses when creating the digests.

When entries of the production and field created response digests are compared, a difference is computed, and the difference is compared to the threshold difference. The threshold difference may be determined on a bit-by-bit basis. If the computed difference is greater than the threshold difference, then the response may be from a trojan. However, if the computed difference is below the threshold difference but greater than zero, then the response may be a real PUF response and the response difference may be due to aging or some other normal factor. In the event a suspected trojan is detected a trojan attack indication labeled "TROJAN ATTACK WARNING."

In another embodiment, a digest of PUF responses may be created using histograms over the number of bits in a logic one state of the PUF response words. In an example using histograms, provided below, the challenges have 3 bits and responses have 8 bits. Note that a real PUF would have many more bits.

TABLE 1

| Challenge | Response | No. of response bits in logic-1-state |
|---|---|---|
| 000 | 01011101 | 5 |
| 001 | 11010000 | 3 |
| 010 | 01000000 | 1 |
| 011 | 11011101 | 6 |
| 100 | 11010010 | 4 |
| 101 | 11101110 | 6 |
| 110 | 01010110 | 4 |

Figure 3:
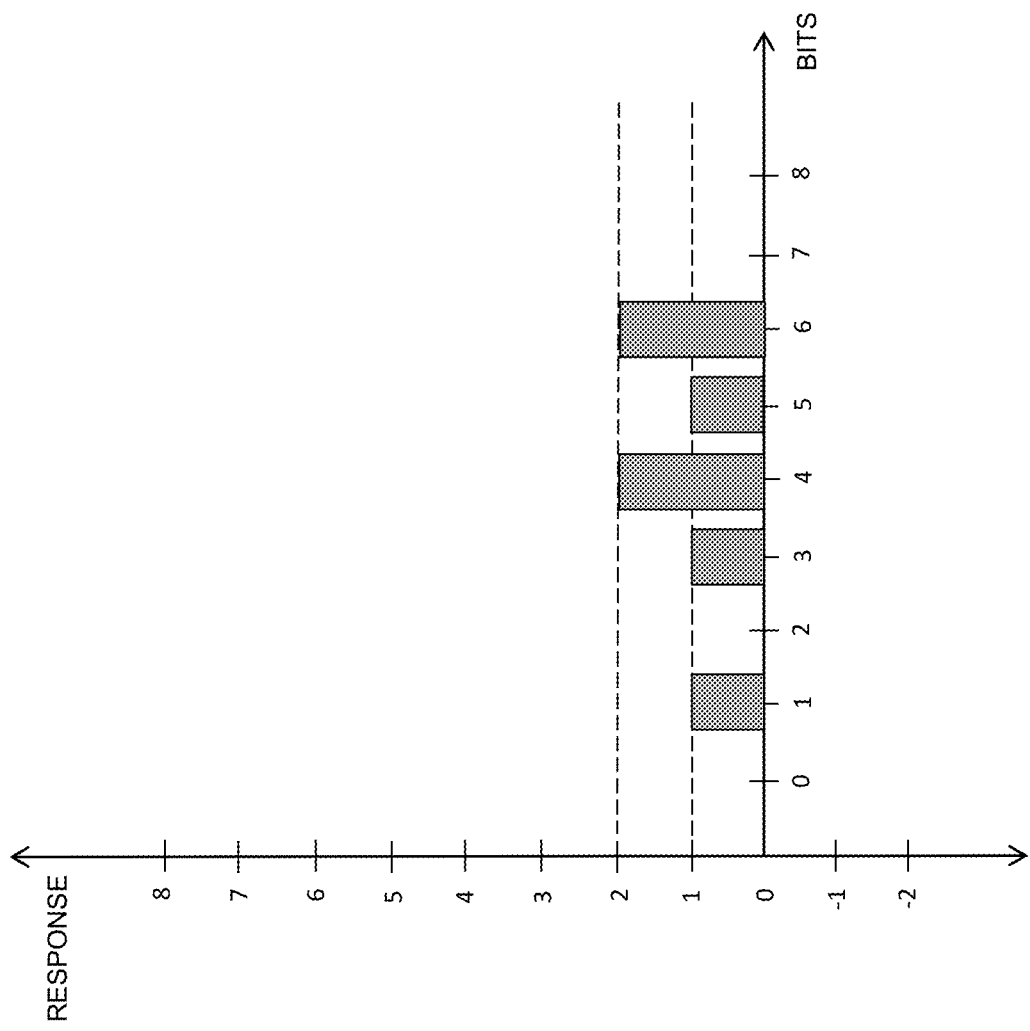
FIG. 3 illustrates a graph of responses versus number of bits for an example histogram for a production list of responses in accordance with an embodiment.

Table 1 shows examples of challenge-response pairs created during production testing of a PUF. In the example of Table 1, there are no responses with zero bits in a logic 1 state, one response (for challenge 010) with one bit in a logic 1 state, two response (for challenge words 100 and 110) have four bits in a logic 1 state, and so forth. The response data of Table 1 may be summarized in a histogram, as shown in FIG. 3, where the right most bar, e.g., indicates that there are two responses with each having six bits in a logic 1 state.

Table 2 shows an example of challenge-response pairs during a field test of the PUF. In a field test, assume two responses have changed from the production test. Both responses have one bit flipped as indicated by underlining of the changed bits in Table 2.

TABLE 2

| Challenge | Response | No. of response bits in logic-1-state |
|---|---|---|
| 000 | 0101110<u>0</u> | <u>4</u> |
| 001 | 11010000 | 3 |
| 010 | 0100000<u>1</u> | <u>2</u> |
| 011 | 11011101 | 6 |
| 100 | 11010010 | 4 |
| 101 | 11101110 | 6 |
| 110 | 01010110 | 4 |

Figure 4:
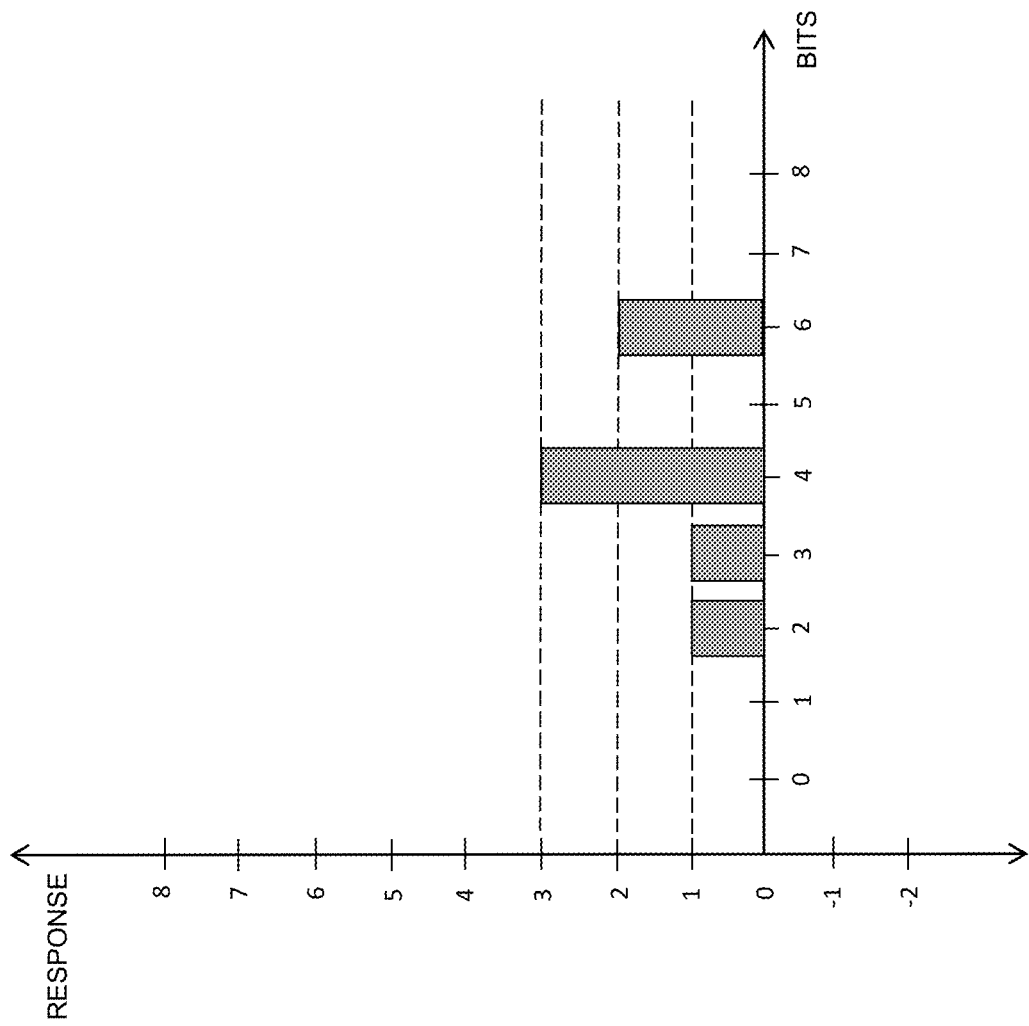
FIG. 4 illustrates a graph of responses versus number of bits for an example list of responses generated in the field in accordance with an embodiment.

The response data of Table 2 may be summarized in a histogram as shown in FIG. 4.

Figure 5:
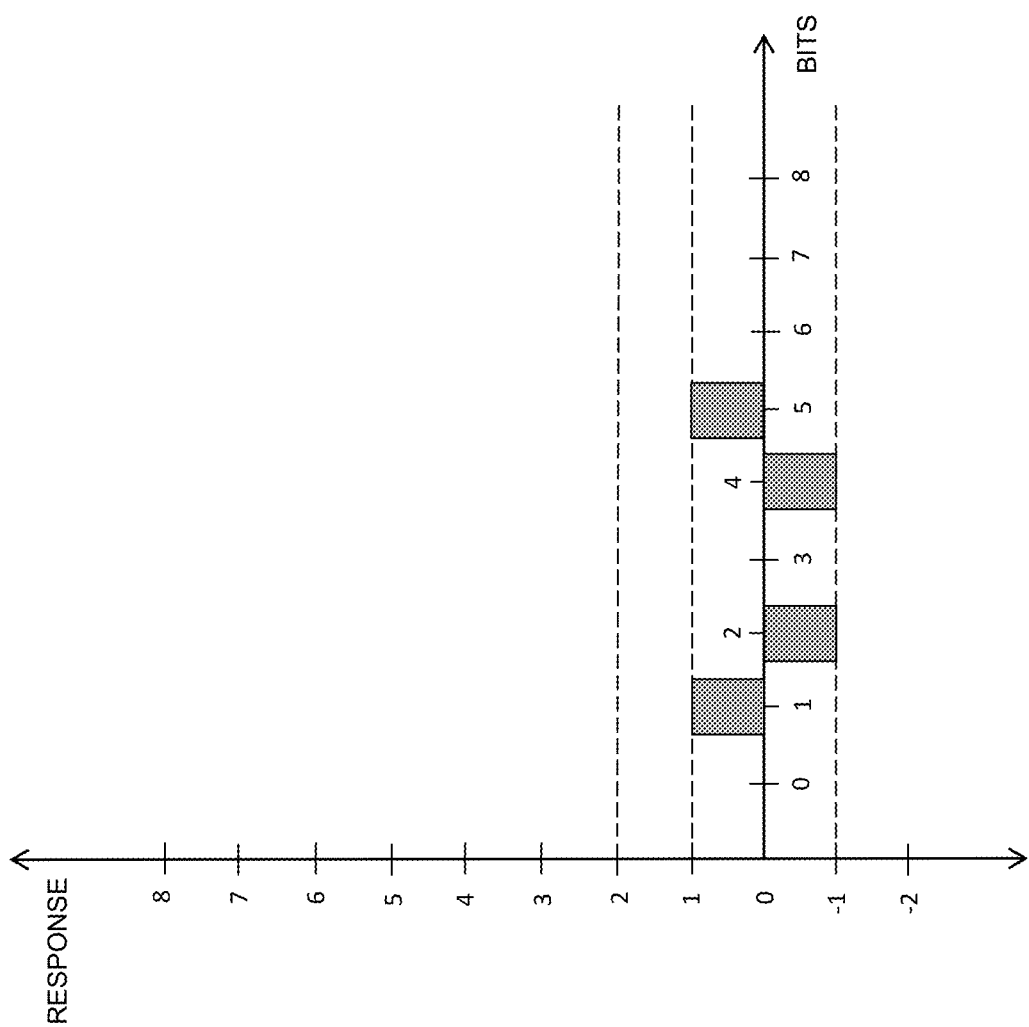
FIG. 5 illustrates a graph of responses versus number of bits for a difference between the lists of FIG. 3 and FIG. 4.

In the next step, the two histograms are subtracted, and the resulting differences are shown in the graph of FIG. 5.

Finally, the sum of the absolute values of all histogram entries of the difference histogram are is calculated as a measure of how much the responses have changed over the life of the PUF. In this case, the result is 4, and this is the final result of the difference of the digest at production test versus the digest in the field. This final result is then compared to a difference threshold. In this case, if the difference threshold is exceeded, an indication such as a warning or error message is issued. The histograms of Table 1 and Table 2 illustrate one possible embodiment of an algorithm to create a digest. Because of the way PUF responses are created, a change in a challenge does not always result in an equal change in the response. Implementing response data compression using histograms mostly fulfils the requirement that each change of a response is reflected in a proportional change of the digest.

Referring back to FIG. 2, in one embodiment, a PUF modeling attack is detected by the modeling attack detection circuit 26 by detecting a particular regularity of a sequence of challenges. In a modeling attack, data words of challenges input by an attacker may be steadily increasing or decreasing. Also, the time interval between one challenge and the next challenge may be constant for a complete series of challenges. In addition, the time interval between one challenge and the next may be relatively small. Finally, the challenge words are likely to follow a certain pattern, e.g., differing in only one bit from one challenge to the next.

An attacker may use a machine learning algorithm to assist with the attack. The use of a machine learning model trained with active learning provides more efficient gain compared to machine learning on a fixed set of CRPs. Active learning implies a multi-step learning approach, in which an initial training step of CRPs is used to provide an initial base level of training. Then, after the initial training, new CRPs are selectively requested to optimize learning. In such an attack, inference phases of several CRP requests are followed by training phases, in which no CRPs are requested.

To detect a modeling attack using modeling attack detection circuit 26, challenge analysis circuit 42 receives a series of challenges (CHALLENGE in FIG. 2) and creates a statistic over the challenge words used. Deviations from a random distribution of the challenge words, such as a non-random distribution may indicate a modeling attack. Pattern detection is carried out by challenge analysis circuit 42, interval analysis circuit 44, and sequence analysis circuit 46. Sequence analysis circuit 46 monitors the incoming challenges for a sequence of consecutive challenges. Interval analysis circuit 44 creates a statistic over the timing intervals between challenges or blocks of challenges. Control circuit 40 is used to activate and control challenge analysis circuit 42, interval analysis circuit 44, and sequence analysis circuit 46. Control circuit 40 collects the responses and compares the responses to a pre-defined threshold or limit and provides a modeling attack indication labeled "MODELING ATTACK WARNING."

The hardware trojan detection circuit 24 and the modeling attack detection circuit 26 can share some of the resources. For example, the control circuits 32 and 40 may be merged into one control circuit.

Figure 6:
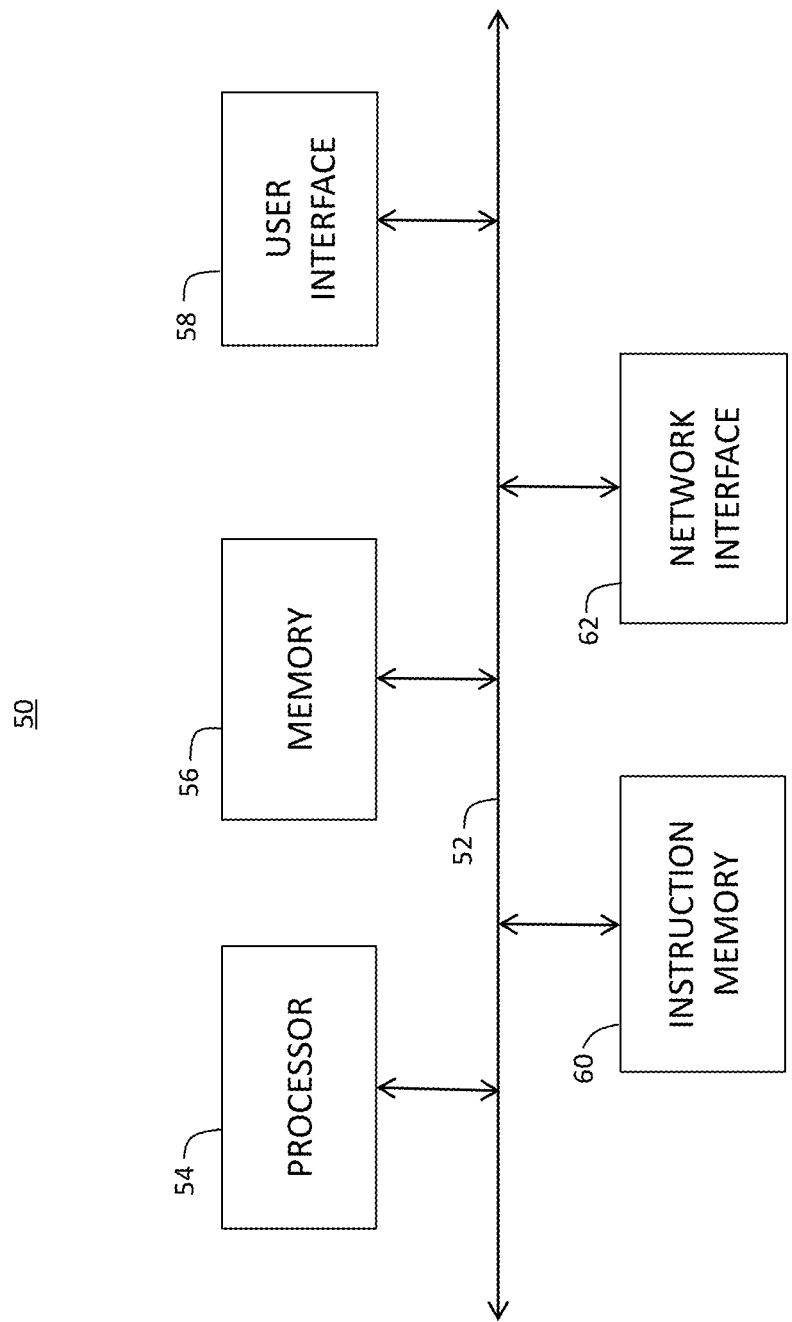
FIG. 6 illustrates a data processing system useful for implementing the PUF protection system of FIG. 2.

FIG. 6 illustrates data processing system 50 useful for implementing PUF protection system 10 of FIG. 2. Data processing system 50 may be implemented on one or more integrated circuits and may be used in an implementation of the described embodiments. Data processing system 50 includes bus 52. Bus 52 may be used to convey one or more of data, address, and/or control information. Connected to bus 52 is processor 54, memory 56, user interface 58, instruction memory 60, and network interface 62. Processor 54 may be any hardware device capable of executing instructions stored in memory 56 or instruction memory 60. For example, processor 54 may execute the machine learning algorithms. Processor 54 may have multiple processing cores. Processor 54 may be, for example, a microprocessor, field programmable gate array (FPGA), application-specific integrated circuit (ASIC), or similar device. Processor 54 may be implemented in a secure hardware element and may be tamper resistant.

Memory 56 may be any kind of memory, such as for example, L1, L2, or L3 cache or system memory. Memory 56 may include volatile memory such as static random-access memory (SRAM) or dynamic RAM (DRAM), or may include non-volatile memory such as flash memory, read only memory (ROM), or other volatile or non-volatile memory. Also, memory 56 may be implemented in a secure hardware element. Alternately, memory 56 may be a hard drive implemented externally to data processing system 50. In one embodiment, memory 56 is used to store data used in the execution of instructions.

User interface 58 may be connected to one or more devices for enabling communication with a user such as an administrator. For example, user interface 58 may be enabled for coupling to a display, a mouse, a keyboard, or other input/output device. Network interface 62 may include one or more devices for enabling communication with other hardware devices. For example, network interface 62 may include, or be coupled to, a network interface card (NIC) configured to communicate according to the Ethernet protocol. Also, network interface 62 may implement a TCP/IP stack for communication according to the TCP/IP protocols. Data samples for classification may be input via network interface 62, or similar interface. Various other hardware or configurations for communicating are available.

Instruction memory 60 may include one or more machine-readable storage media for storing instructions for execution by processor 54. In other embodiments, both memories 56 and 60 may store data upon which processor 54 may operate. Memories 56 and 60 may also store, for example, encryption, decryption, and verification applications. Memories 56 and 60 may be implemented in a secure hardware element and be tamper resistant.

Figure 7:
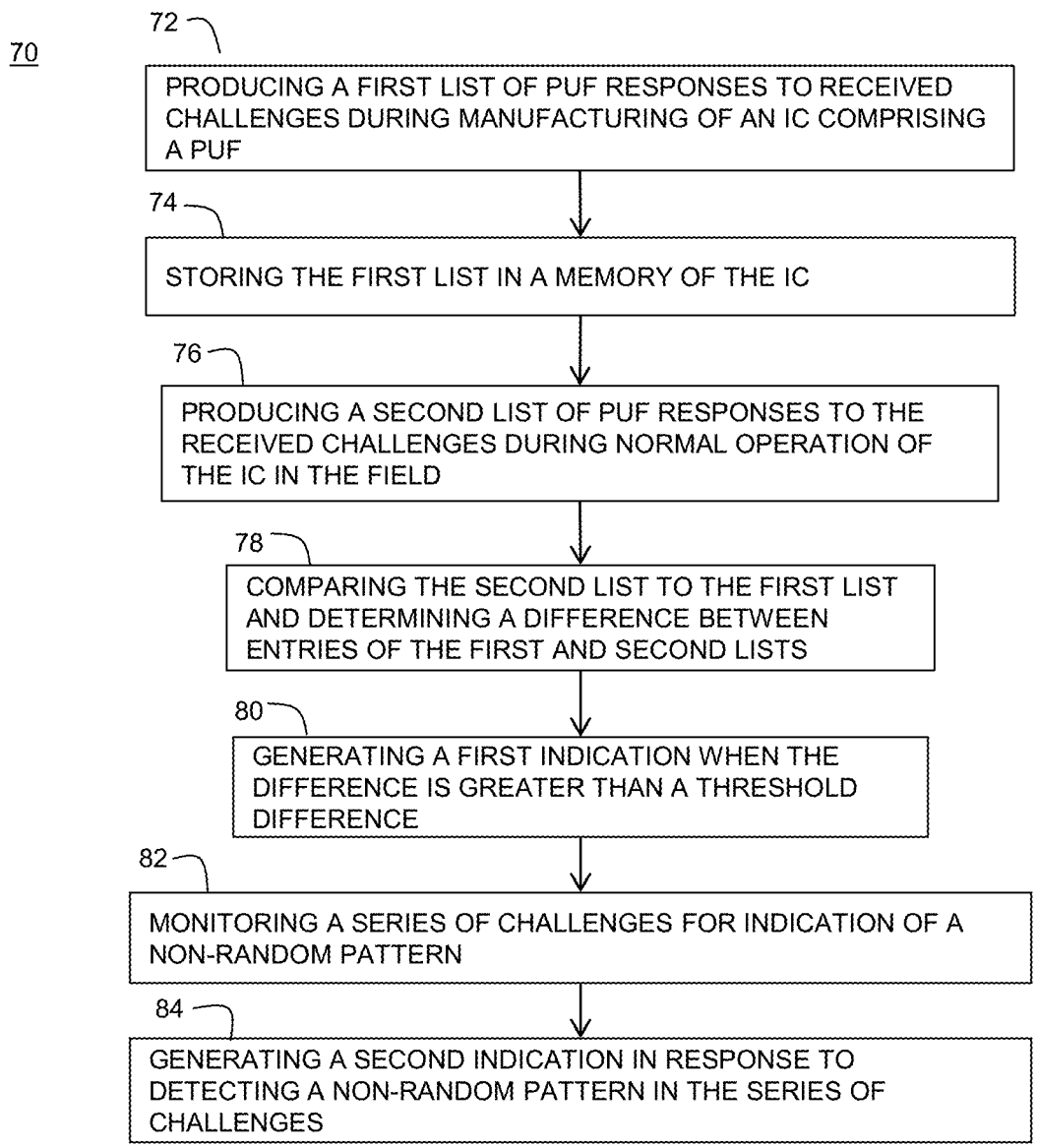
FIG. 7 illustrates a method for protecting a PUF in accordance with an embodiment.

FIG. 7 illustrates method 70 for protecting a PUF in accordance with an embodiment. Method 70 starts at step 72. At step 72, a first list, or digest, of PUF responses is produced during manufacturing, or production, of an IC comprising the PUF. In one embodiment, the first list is produced during a production testing phase. At step 74, the first list is stored in memory 36. Alternately, the memory may be external to the IC. At step 76, after the IC is operating in the field, a second list of PUF responses is produced. The second list may be created during normal operation of the IC when the PUF is not active. Additional new second lists may be created during operation in the field from time-to-time. At step 78, the second list is compared to the first list. A difference between entries of the first and second lists is computed. At step 80, if the difference between entries is greater than a threshold difference, then a first attack indication of an active hardware trojan is generated. If the difference is below the threshold difference but greater than zero, the difference is assumed to be caused by aging or changing environmental conditions, and no indication is generated. The difference between entries may be determined on a bit-by-bit basis. At step 82, a series of challenges is monitored for indications of an ordered sequence. For example, the challenges may be in an order, or a time interval between challenges may have a regular spacing. At step 84, a second attack indication is generated in response to detecting a non-random pattern in the series of challenges, where the second attack indication indicates a potential modeling attack on the PUF. The first and second attack indications may be provided as flags in a status register file of a microprocessor.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting an attack on a physically unclonable function (PUF), the method comprising:
producing a first list of PUF responses to challenges received during production testing of an integrated circuit comprising the PUF;
storing the first list in a memory on the integrated circuit;
producing a second list of PUF responses to the challenges received during normal operation of the integrated circuit in the field;
comparing the second list to the first list and determining a difference between entries of the first and second lists;
generating an indication of a trojan attack on the PUF when the difference is greater than a first threshold difference; and
monitoring a series of challenges for the PUF, wherein a time interval between consecutive challenges of the series of challenges is measured, and wherein a regular time interval between the consecutive challenges indicates a modeling attack on the PUF.

2. The method of claim 1, wherein producing the second list further comprises varying a supply voltage to the PUF to increase variation in the entries of the second list.

3. The method of claim 1, wherein producing the first and second lists further comprises applying one of a hash function, compression function, checksum to each of the first and second lists.

4. The method of claim 1, further comprising:
creating first and second histograms from the first and second lists, respectively; and
determining a difference between the first and second histograms, if the difference between the first and second histograms is greater than a second threshold difference, indicating a suspected attack on the PUF.

5. The method of claim 1, wherein the challenges for the second list of PUF responses are taken from an irregular address interval of a challenge word space.

6. The method of claim 5, wherein the PUF is characterized as being a strong PUF.

7. The method of claim 5, wherein the PUF is monitored for aging, and wherein if a lack of aging is detected, providing an indication.

8. The method of claim 1, wherein monitoring the series of challenges further comprises one or more of counting a frequency of different challenges, monitoring data words of the challenges for sequence patterns, and monitoring the challenges for PUF responses for a frequency of consecutive challenges for PUF responses.

9. A method for detecting an attack on a physically unclonable function (PUF), the method comprising:
producing a first list of PUF responses to received challenges during manufacturing of an integrated circuit comprising the PUF;
storing the first list in a memory;
producing a second list of PUF responses to received challenges during normal operation of the integrated circuit in the field;
comparing the second list to the first list and determining a difference between entries of the first and second lists;
generating a first indication of the trojan attack on the PUF when the difference is greater than a threshold difference;

monitoring a series of challenges for an indication of an ordered sequence of challenges, wherein a time interval between each of the challenges is measured; and generating a second indication of a modeling attack on the PUF in response to detecting a non-random timing pattern in the ordered sequence of challenges and detecting a regular interval between the challenges.

10. The method of claim 9, wherein producing the second list further comprises varying a supply voltage to the PUF to increase variation in the entries of the first and second lists.

11. The method of claim 9, wherein producing the first and second lists further comprises applying one of a hash function, a compression function, and a checksum to each of the first and second lists.

12. The method of claim 9, further comprising:
creating first and second histograms from the first and second lists, respectively; and
determining a difference between the first and second histograms, if the difference between the first and second histograms is greater than a second threshold difference, indicating a suspected attack on the PUF.

13. The method of claim 9, wherein the non-random timing pattern comprises one or more of counting a frequency of different challenges for PUF responses, and monitoring data words of the challenges for sequence patterns.

14. The method of claim 9, wherein the PUF is characterized as being a strong PUF.

15. The method of claim 9, further comprising monitoring the PUF for aging, and wherein if a lack of aging is detected, providing the indication of the trojan.

16. A physically unclonable function (PUF) protection system comprising:

a digest calculation circuit, coupled to the output of a PUF, the digest calculation circuit for producing a first list of PUF responses during production testing of the PUF, and for producing a second list of PUF responses during normal operation of the PUF in the field;

a challenge analysis circuit for monitoring a series of challenges for a time interval between each of the challenges, and wherein a regular interval between the challenges indicates a modeling attack;

a memory for storing the first list;

a comparison circuit for comparing the second list to the first list and determining a difference between entries of the first and second lists; and a control circuit for generating a first indication of a trojan attack on the PUF when the difference is greater than a threshold difference, and the control circuit for generating a second indication of a modeling attack in response to detecting the regular interval.

17. The PUF protection system of claim 16, wherein the PUF protection system is implemented on one or more integrated circuits.

18. The PUF protection system of claim 16, further comprising a variable voltage regulator for providing a variable supply voltage to the PUF to increase variation of entries in the first and second lists.

19. The PUF protection system of claim 16, wherein the challenges for the second list of PUF responses are taken from an irregular address interval of a challenge word space.

20. The PUF protection system of claim 16, wherein the PUF is characterized as being a strong PUF.

* * * * *